(12) United States Patent
Fischer et al.

(10) Patent No.: US 10,773,997 B2
(45) Date of Patent: Sep. 15, 2020

(54) TRANSPARENT PANE

(71) Applicant: SAINT-GOBAIN GLASS FRANCE, Courbevoie (FR)

(72) Inventors: Klaus Fischer, Alsdorf (DE); Matthias Kuehne, Torgau (DE); Sandra Hornschuh, Torgau (DE); Roberto Zimmermann, Solingen (DE); Martin Henseler, Aachen (DE); Dagmar Schaefer, Herzogenrath (DE); Michael Jansen, Eschweiler (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 43 days.

(21) Appl. No.: 16/070,273

(22) PCT Filed: Mar. 20, 2017

(86) PCT No.: PCT/EP2017/056479
§ 371 (c)(1),
(2) Date: Jul. 13, 2018

(87) PCT Pub. No.: WO2017/198362
PCT Pub. Date: Nov. 23, 2017

(65) Prior Publication Data
US 2019/0023610 A1    Jan. 24, 2019

(30) Foreign Application Priority Data
May 17, 2016    (EP) .................................... 16169823

(51) Int. Cl.
*C03C 17/36*    (2006.01)
*B32B 17/10*    (2006.01)
(Continued)

(52) U.S. Cl.
CPC .......... *C03C 17/3618* (2013.01); *B32B 7/023* (2019.01); *B32B 17/1022* (2013.01);
(Continued)

(58) Field of Classification Search
CPC ....... B32B 7/02–7/027; B32B 17/00–17/1099; C03C 17/00–17/44
See application file for complete search history.

(56) References Cited

U.S. PATENT DOCUMENTS 5,999,314 A    12/1999  Motoh et al.
8,766,879 B2    7/2014  Fujikawa et al.
(Continued)

FOREIGN PATENT DOCUMENTS

CA    2076420 A1    2/1993
CN    104267499 A    1/2015
(Continued)

OTHER PUBLICATIONS

International Search Report issued for International Patent Application No. PCT/EP2017/056479, filed Mar. 20, 2017 on behalf of Saint-Gobain Glass France, dated May 22, 2017. 5 pages (German Original + English Translation).

*Primary Examiner* — Prashant J Khatri
(74) *Attorney, Agent, or Firm* — Pillsbury Winthrop Shaw Pittman LLP

(57) ABSTRACT

A transparent pane comprising a transparent substrate and an electrically conductive coating on a surface of the transparent substrate is disclosed. The electrically conductive coating comprises four functional layers arranged one atop another. Each functional layer comprises a layer of optically highly refractive material with a refractive index >1.3, a first matching layer above the layer of optically highly refractive material, an electrically conductive layer above the first matching layer, and a second matching layer above the (Continued)

Figure 1:
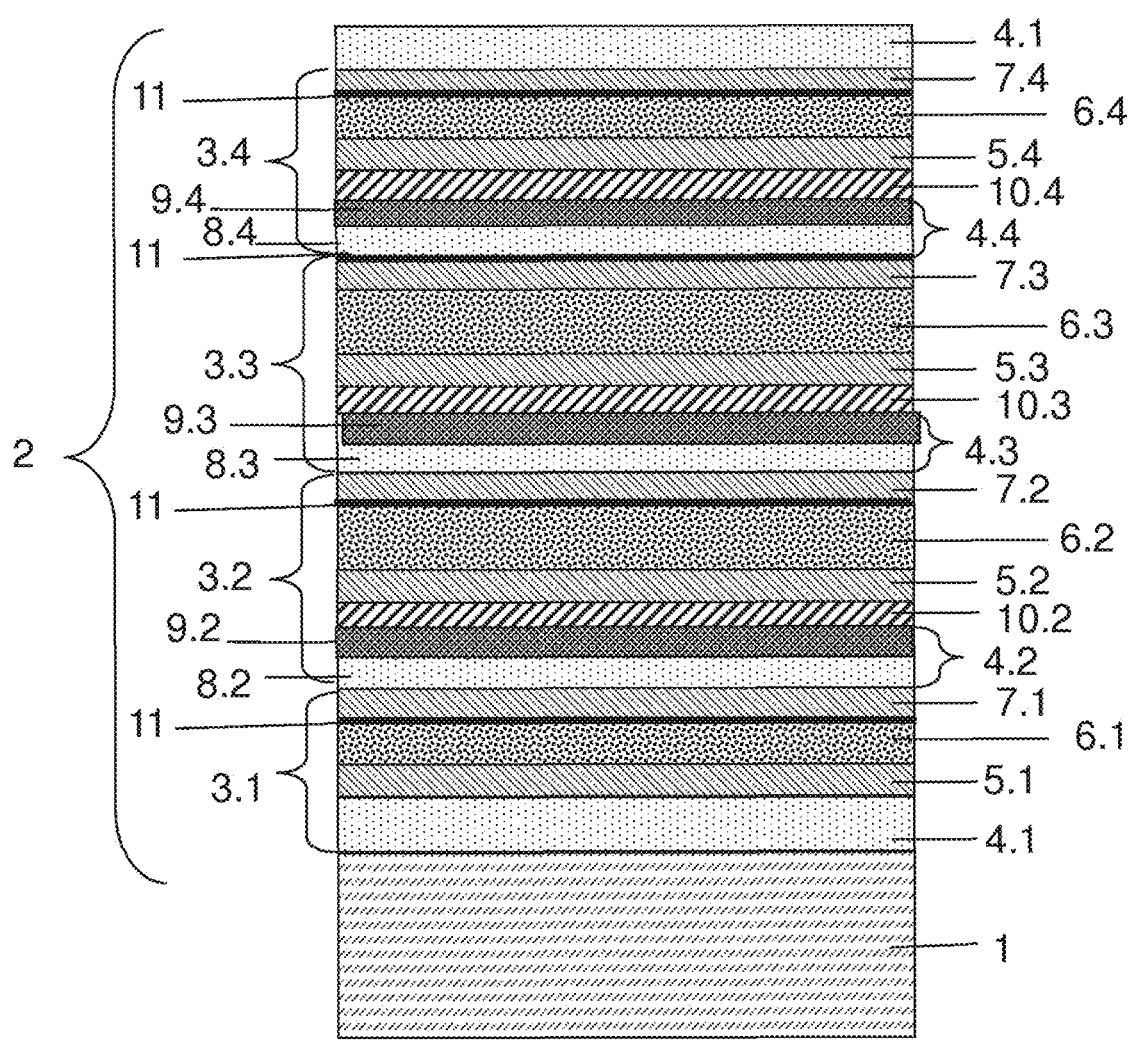

electrically conductive layer. The layer thickness of each conductive layer can be 5 nm to 25 nm and the total layer thickness of all electrically conductive layers can be 20 nm to 100 nm.

13 Claims, 3 Drawing Sheets

(51) Int. Cl.
*B32B 7/023* (2019.01)
*B60J 1/00* (2006.01)
*B60J 1/02* (2006.01)

(52) U.S. Cl.
CPC .. *B32B 17/10036* (2013.01); *B32B 17/10201* (2013.01); *B32B 17/10229* (2013.01); *B32B 17/10761* (2013.01); *B60J 1/001* (2013.01); *B60J 1/02* (2013.01); *C03C 17/36* (2013.01); *C03C 17/366* (2013.01); *C03C 17/3626* (2013.01); *C03C 17/3639* (2013.01); *C03C 17/3644* (2013.01); *C03C 17/3649* (2013.01); *C03C 17/3652* (2013.01); *C03C 17/3673* (2013.01); *C03C 17/3681* (2013.01); *B32B 2255/205* (2013.01); *B32B 2255/28* (2013.01); *B32B 2307/202* (2013.01); *B32B 2307/204* (2013.01); *B32B 2307/412* (2013.01); *B32B 2307/416* (2013.01); *B32B 2307/418* (2013.01); *B32B 2605/006* (2013.01); *B32B 2605/08* (2013.01); *C03C 2217/944* (2013.01); *C03C 2218/155* (2013.01); *C03C 2218/156* (2013.01)

(56) References Cited

U.S. PATENT DOCUMENTS

| | | |
|---|---|---|
| 2009/0303604 A1 | 12/2009 | Martin |
| 2012/0177900 A1 | 7/2012 | Laurent et al. |
| 2014/0017472 A1 | 1/2014 | Coster et al. |
| 2014/0198389 A1 | 7/2014 | Laurent et al. |
| 2014/0319116 A1 | 10/2014 | Fischer et al. |
| 2014/0362434 A1* | 12/2014 | Schmitz .................. H05B 3/84 359/350 |
| 2015/0004383 A1 | 1/2015 | Sandre-Chardonnal |
| 2016/0370586 A1 | 12/2016 | Saenger |

FOREIGN PATENT DOCUMENTS

| | | |
|---|---|---|
| DE | 42 27 582 A1 | 2/1993 |
| DE | 10-2011-0758887 A1 | 11/2012 |
| EP | 2 131 227 A2 | 12/2009 |
| EP | 1 923 365 B1 | 10/2011 |
| JP | H10-148787 A | 6/1998 |
| JP | 2014-504583 A | 2/2014 |
| JP | 2015-507600 A | 3/2015 |
| RU | 2179537 C2 | 2/2002 |
| WO | WO 01/027050 A1 | 4/2001 |
| WO | 03/024155 A2 | 3/2003 |
| WO | WO 2011/020974 A1 | 2/2011 |
| WO | 2012/052315 A1 | 4/2012 |
| WO | WO 2012/140098 A1 | 10/2012 |
| WO | 2013/104439 A1 | 7/2013 |
| WO | 2013/107983 A1 | 7/2013 |

\* cited by examiner

TRANSPARENT PANE

CROSS REFERENCE TO RELATED APPLICATIONS

The present application is the U.S. national stage of International Patent Application PCT/EP2017/056479 filed internationally on Mar. 20, 2017, which, in turn, claims priority to European Patent Application No. 16169823.8 filed on May 17, 2016.

The invention relates to a transparent pane with an electrically conductive coating, a method for producing the pane, and use thereof.

High demands are made on motor vehicle glazing. The following legal regulations apply with regard to the size of the field of vision and the structural stability of the panes:

ECE R 43: "Einheitliche Vorschriften für die Genehmigung des Sicherheitsglases and der Verbundglaswerkstoffe [Uniform Provisions Concerning the Approval of Safety Glazing and Composite Glazing Materials]" as well as Technische Anforderungen an Fahrzeugteile bei der Bauartprufung [Technical requirements for vehicle parts for type testing] § 22 a StVZO [German road vehicle code], "Safety Glass".

These regulations are usually met by composite glass panes. Composite glass panes consist of two or more individual panes, in particular made of float glass and are fixedly joined to one another with one or a plurality of intermediate layers with heat and pressure. The intermediate layers are usually made of thermoplastic plastics such as polyvinyl butyral (PVB) or ethylene vinyl acetate (EVA).

The pane can have an electrical heating function, based on transparent, electrical coatings. Such electrically conductive coatings can have a plurality of metallic and dielectric thin layers. Coatings based on thin silver layers are economically producible and resistant to aging.

Such electrically conductive coatings can be used as coatings with reflecting properties for the infrared range or also as heatable coatings. WO 03/024155 A2 discloses, for example, an electrically conductive coating with two silver layers.

The object of the present invention consists in providing a transparent pane having an improved electrically conductive coating. The electrically conductive coating should have improved reflecting properties.

The object of the present invention is accomplished according to the invention by a transparent pane having an electrically conductive coating in accordance with the disclosure. Preferred embodiments are also disclosed. A method for producing the transparent pane having an electrically conductive coating and a use of the transparent pane is further disclosed.

The transparent pane according to the invention comprises at least one transparent substrate and at least one electrically conductive coating on at least one surface of the transparent substrate, wherein the electrically conductive coating includes at least four functional layers arranged one atop another and each functional layer at least includes a layer of optically highly refractive material with a refractive index $\geq 1.3$, a first matching layer above the layer of optically highly refractive material, an electrically conductive layer above the first matching layer, a second matching layer above the electrically conductive layer, wherein the layer thickness of one of the electrically conductive layers is in each case from 5 nm to 25 nm and the total layer thickness of all electrically conductive layers is from 20 nm to 100 nm, and at least one layer of optically highly refractive material arranged between two electrically conductive layers comprises a layer of a dielectric material with a refractive index less than or equal to 2.1 and a layer of an optically highly refractive material with a refractive index greater than or equal to 2.1, and a further layer of optically highly refractive material with a refractive index $\geq 1.9$ is arranged above the uppermost functional layer.

If a first layer is arranged above a second layer, this means, in the context of the present invention, that the first layer is arranged farther from the substrate on which the layers are applied than the second layer.

If a first layer is arranged below a second layer, this means, in the context of the present invention, that the second layer is arranged farther from the substrate on which the layers are applied than the first layer.

In the context of the invention, a layer can be made of one material. A layer kann, however, also include two or more individual layers made of different materials. A functional layer according to the invention includes, for example, at least one layer of optically highly refractive material, a first and a second matching layer, and an electrically conductive layer.

The total layer thickness of all electrically conductive layers of the entire electrically conductive coating is, according to the invention, from 20 nm to 100 nm. In this advantageous range for the total thickness of all silver-containing layers, with typical distances h between two busbars, and an operating voltage U from 12 V to 15 V, adequately high heating power P and adequately high transmittance are advantageously obtained. The coating usually has sheet resistances in the range from 0.5 ohm/square to 1 ohm/square.

Each functional layer of the electrically conductive coating according to the invention has at least one layer of optically highly refractive material arranged between two electrically conductive layers, which includes a layer of a dielectric material with a refractive index less than or equal to 2.1 and a layer of an optically highly refractive material with a refractive index greater than or equal to 2.1.

The particular advantage of the invention resides in the design of at least one layer of optically highly refractive material arranged between two electrically conductive layers, which includes, according to the invention, at least one layer of a dielectric material with a refractive index less than 2.1 and at least one layer of an optically highly refractive material with a refractive index greater than or equal to 2.1. It has surprisingly been found that such a layer structure results in high transmittance and color neutrality and thus significantly improves the reflecting properties.

A layer of optically highly refractive material lies, in the context of the invention, between two electrically conductive layers when at least one electrically conductive layer is arranged above the layer of optically highly refractive material and when an electrically conductive layer is arranged below the layer of optically highly refractive material. This arrangement, however, does not require direct contact between the electrically conductive layer and the layer of optically highly refractive material.

Preferably, the first and/or the second matching layer can include a zinc oxide. A preferred embodiment of the invention provides that the thickness of the layer of optically highly refractive material can be 10 nm to 100 nm, with a layer of optically highly refractive material, having at least a thickness of 20 nm, arranged between two electrically conductive layers. Furthermore, the layer of highly refractive material can have a refractive index greater than or equal to 1.9 and/or contain at least silicon nitride or mixed silicon/metal nitride, such as SiZrN, and mixtures thereof.

In a particularly preferred embodiment of the transparent pane according to the invention, the layer of optically highly refractive material includes a mixed silicon/zirconium nitride. The mixed silicon/zirconium nitride is preferably deposited with a target that contains from 40 wt.-% to 70 wt.-% silicon, from 30 wt.-% to 60 wt.-% zirconium as well as production-related admixtures. The target particularly preferably contains from 45 wt.-% to 60 wt.-% silicon, from 40 wt.-% to 55 wt.-% zirconium as well as production-related admixtures. The deposition of the mixed silicon/zirconium nitride is done under addition of nitrogen as reaction gas during the cathodic sputtering.

Another preferred embodiment of the transparent pane according to the invention provides a smoothing layer that can be arranged at least between two electrically conductive layers, in particular below one of the first matching layers. The smoothing layer can contain a mixed zinc/tin oxide. An electrically conductive layer deposited on a smoother surface has a higher degree of transmittance with a simultaneously lower sheet resistance. This effect is the more propitious, the thinner the electrically conductive layer.

In another preferred embodiment of the transparent pane according to the invention, another layer of optically highly refractive material with a refractive index ≥1.9 is provided above the uppermost functional layer. This layer can contain silicon nitride as an optically highly refractive material. The use of silicon nitride protects the layers arranged thereunder against corrosion, adapts the optical properties of the functional layers to those of the intermediate layer, and is particularly economical.

The values indicated for refractive indices are measured by helium-neon laser at a wavelength of 633 nm.

In a particularly preferred embodiment of the transparent pane according to the invention, the electrically conductive layer has at least silver or a silver-containing alloy. The silver-containing layers contain at least 90 wt.-% silver, preferably 99.9 wt.-%. The silver-containing layers are applied with conventional methods for layer deposition of metals, for example, by vacuum methods such as magnetron-enhanced cathodic sputtering.

The layer thicknesses of the matching layer, of the smoothing layer, of the layer of optically highly refractive material, and of the silver-containing layer with the desired properties in terms of transmittance, sheet resistance, and color values, are apparent to the person skilled in the art in a simple manner through simulations in the range of the above indicated layer thicknesses.

In an advantageous embodiment of the transparent pane according to the invention, the electrically heatable coating extends to at least 50%, preferably to at least 70%, and particularly preferably to at least 90% of the area of the side of the pane on which it is applied.

Moreover, it is preferred that at least one functional layer has a blocker layer adjacent the electrically conductive layer and that the blocker layer preferably contains at least nickel, chromium, or alloys thereof. The blocker layer can have a thickness from 0.1 nm to 5 nm. The blocker layer between the second matching layer and the silver-containing layer prevents contact of the sensitive silver-containing layer with the oxidizing reactive atmosphere during the deposition of the following layer made of zinc oxide by reactive cathodic sputtering.

The matching layer, the smoothing layer, the layer of optically highly refractive material, the blocker layer, and the silver-containing layer are deposited by methods known per se, for example, by magnetron-enhanced cathodic sputtering. The cathodic sputtering is done in a protective gas atmosphere, for example, of argon, or in a reactive gas atmosphere, for example, through addition of oxygen or nitrogen.

The transparent substrate can be joined to a second pane via a thermoplastic intermediate layer to form a composite pane and have total transmittance greater than 70%. The term "total transmittance" is based on the process for testing the light permeability of motor vehicle windows specified by ECE-R 43, Annex 3, § 9.1. The composite pane and/or the intermediate layer can have a wedge-shaped cross-section. The wedge-shaped cross-section has the effect that with a reflection, no additional, undesirable double images are created.

The electrically heatable coating preferably extends over the entire area of the side of the pane on which it is applied, minus a peripheral frame-like de-coated region with a width of 2 mm to 20 mm, preferably from 5 mm to 10 mm. This serves for electrical insulation between the voltage-carrying coating and the vehicle body. The de-coated region is preferably hermetically sealed by the intermediate layer or by an acrylic adhesive as a vapor diffusion barrier. The corrosion-sensitive coating is protected against moisture and atmospheric oxygen by the vapor diffusion barrier. Additionally, the electrically heatable coating can be de-coated in another region, which serves, for example, as a data transmission window or a communication window. The transparent pane is permeable to electromagnetic and, in particular, to infrared radiation in the other de-coated region.

In a preferred embodiment of the transparent pane according to the invention, the electrically heatable coating is connected to a voltage source via busbars, and a voltage applied on the electrically heatable coating has a value of 12 V to 15 V.

The transparent, electrically conductive coating is connected to busbars for transferring electrical power.

The busbars are advantageously produced by printing a conductive paste that is fired before the bending and/or at the time of the bending of the glass pane. The conductive paste preferably contains silver particles and glass frits. The layer thickness of the fired silver paste is preferably from 5 µm to 20 µm.

In an alternative embodiment of the busbars, thin and narrow metal foil strips or metal wires that preferably contain copper and/or aluminum are used; in particular, copper foil strips with a thickness of approx. 50 µm are used. The width of the copper foil strips is preferably 1 mm to 10 mm. The metal foil strips or metal wires are placed on the coating during assembly of the bonding layers. In the subsequent autoclave process, a more reliable electrical contact between the busbars and the coating is achieved through the action of heat and pressure. The electrical contact between the coating and the busbars can alternatively be established by soldering or by gluing with an electrically conductive adhesive.

In the automotive sector, foil conductors are customarily used as feed lines for contacting busbars in the interior of composite panes. Flexible foil conductors, sometimes also called "flat conductors" or "flat-band conductors", are preferably made of a tinned copper strip with a thickness from 0.03 mm to 0.1 mm and a width from 2 mm to 16 mm. Copper has proven successful for such conductor tracks since it has good electrical conductivity as well as good processability into foils. At the same time, material costs are low. Other electrically conductive materials that can be processed into foils can also be used. Examples for this are aluminum, gold, silver, or tin and alloys thereof.

For electrical insulation and for stabilization, the tinned copper strip is applied on a carrier material made of plastic or laminated therewith on both sides. The insulation material contains, as a rule, a 0.025-mm- to 0.05-mm-thick polyimide-based film. Other plastics or materials with the required insulating properties can also be used. A plurality of conductive layers electrically isolated from each other can be situated in one foil conductor strip.

Foil conductors that are suitable for the contacting of electrically conductive layers in composite panes have a total thickness of only 0.3 mm. Such thin foil conductors can be embedded without difficulty in the thermoplastic adhesive layer between the individual panes.

Alternatively, thin metal wires can also be used as feed lines. The metal wires contain, in particular, copper, tungsten, gold, silver, or aluminum or alloys of at least two of these metals. The alloys can also contain molybdenum, rhenium, osmium, iridium, palladium, or platinum.

In a preferred embodiment of the transparent pane according to the invention, the electrically heatable coating has a heating power from 500 W/m$^2$ to 700 W/m$^2$.

The invention further includes a method for producing a transparent pane with an electrically conductive coating, wherein at least four functional layers are successively applied on a transparent substrate and each functional layer includes at least one layer of optically highly refractive material with a refractive index ≥1.3, wherein a first matching layer is arranged above the layer of optically highly refractive material, an electrically conductive layer is arranged above the first matching layer, a second matching layer is arranged above the electrically conductive layer. The layer thickness of one of the electrically conductive layers is in each case 5 nm to 25 nm and the total layer thickness of all electrically conductive layers is from 20 nm to 100 nm. Also, a layer of optically highly refractive material arranged between two electrically conductive layers comprises a layer of a dielectric material with a refractive index less than or equal to 2.1 and a layer of an optically highly refractive material with a refractive index greater than or equal to 2.1, wherein a further layer (4.1) of optically highly refractive material with a refractive index ≥1.9 is arranged above the uppermost functional layer (3).

The invention further includes the use of the transparent pane as a pane in vehicles, in particular as a windshield in a motor vehicle.

In the following, the invention is explained in detail with reference to drawings and an example. The drawings are a schematic representation and are not true to scale. The drawings in no way restrict the invention.

Figure 2:
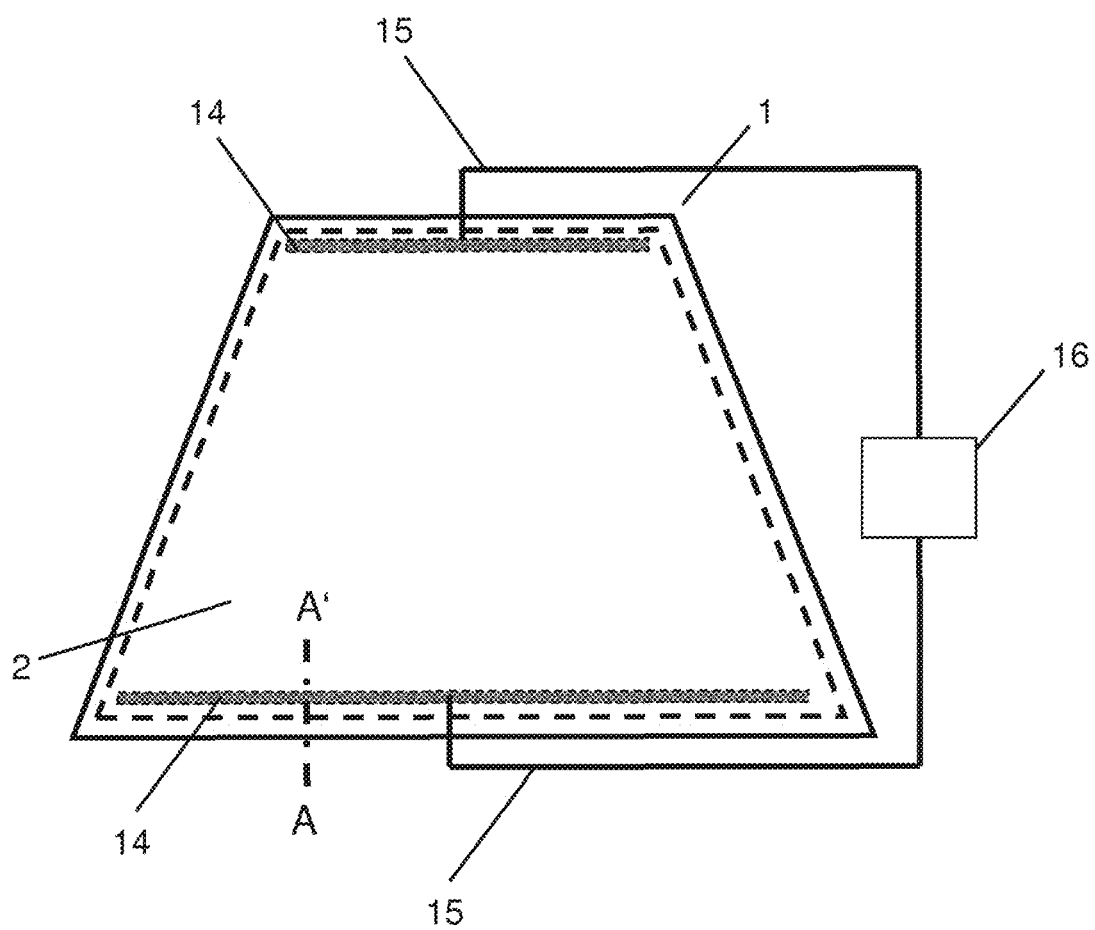
Figure 3:
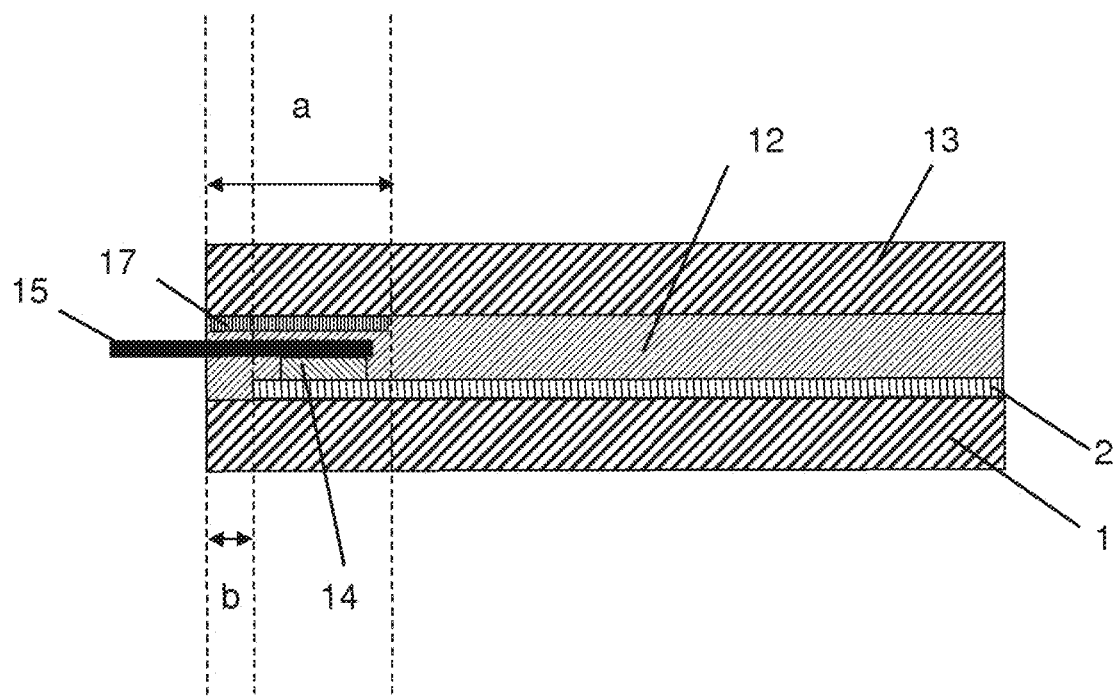

They depict:

FIG. 1 a cross-section through an embodiment of the transparent pane according to the invention having an electrically conductive coating, FIG. 2 a plan view of a transparent pane according to the invention as part of a composite pane, and FIG. 3 a cross-sectional drawing along the section line A-A' of FIG. 2

In the following figures, an embodiment of the transparent pane according to the invention is presented using the example of a windshield of a passenger car. FIG. 1 depicts a transparent pane configured according to the invention having a substrate 1 and an electrically conductive coating 2.

The electrically heatable coating 2 comprises four functional layers 3 (3.1, 3.2, 3.3, and 3.4) that are arranged congruently one atop another. Each functional layer 3 comprises a layer of optically highly refractive material 4 (4.1, 4.2, 4.3, and 4.4) that contains silicon nitride (Si3N4), a first matching layer 5 (5.1, 5.2, 5.3, and 5.4) that contains zinc oxide (ZnO), an electrically conductive layer 6 (6.1, 6.2, 6.3, 6.4) that contains silver or a silver-containing alloy, a second matching layer 10 (10.1, 10.2, 10.3, and 10.4) that contains zinc oxide (ZnO).

The layers are arranged in the order indicated with increasing distance from the substrate 1. Above the uppermost functional layer 3.4, another layer 4.1 of optically highly refractive material with a refractive index 1.9 to 2.1 is provided. This other layer and the bottommost layer of the coating 2 contain in each case silicon nitride (Si$_3$N$_4$) as an optically highly refractive material with a layer thicknesses [sic] from 10 nm to 50 nm. The use of silicon nitride as a cover layer protects the layers arranged thereunder.

The respective first matching layer 5 and the second matching layers 7 contain zinc oxide (ZnO) with a refractive index 1.8 to 2.0 and have layer thicknesses from 2 nm to 20 nm, preferably 5-10 nm.

Each functional layer 3 of the electrically conductive coating 2 has a layer 4.2, 4.3, 4.4 of optically highly refractive material arranged between two electrically conductive layers 6, which comprises a layer 8.2, 8.3, 8.4 of a dielectric material with a refractive index 1.9 to 2.1 and a layer 9.2, 9.3, 9.4 of an optically highly refractive material with a refractive index 2.1 to 2.3.

The layer 8.2, 8.3, 8.4 of a dielectric material with a refractive index less than or equal to 2.1 contains silicon nitride and has a layer thickness from 10 nm to 50 nm, in particular 20 nm to 40 nm.

The layer 9.2, 9.3, 9.4 of an optically highly refractive material with a refractive index greater than or equal to 2.1 contains mixed silicon/zirconium nitride (SiZrNx) and has layer thicknesses from 10 nm to 50 nm, particularly preferably 15 nm to 30 nm.

The electrically conductive layers 6 (6.1, 6.2, 6.3, 6.4) contain silver and have layer thicknesses from 5 nm to 25 nm. Particularly preferred are layer thicknesses from 11 nm to 18 nm. The total layer thickness of all electrically conductive layers 6 (6.1, 6.2, 6.3, 6.4) is 57 nm.

A blocker layer 11 is arranged between each electrically conductive layer 6 (6.1, 6.2, 6.3, 6.4) and the second matching layer 7 arranged thereabove. The blocker layer 11 consists, for example, of a 0.2-nm- to 0.4-nm-thick layer, which contains nickel, chromium, or alloys thereof and was deposited by magnetron-enhanced cathodic sputtering.

Provided in each case between two electrically conductive layers 6 is a smoothing layer 10.2, 10.3, 10.4, which is in each case arranged below one of the first matching layers 5.2, 5.3, 5.4. The smoothing layers 10.2, 10.3, 10.4 contain mixed zinc/tin oxide (ZnSnO) and have layer thicknesses from 2-20 nm, preferably 5-10 nm.

The exact layer sequence with layer thicknesses is presented in Table 1.

TABLE 1

| | Reference Characters | Reference Characters | Layer Thickness |
|---|---|---|---|
| Si3N4 | 4.1 | | 20 nm-40 nm |
| ZnO | 10.4 | 3.4 | 5 nm-10 nm |
| NiCr | 11 | | 0.2-0.4 nm |
| Ag | 6.4 | | 14 nm |
| ZnO | 5.4 | | 5 nm-10 nm |
| ZnSnO | 10.4 | | 5 nm-10 nm |
| SiZrN | 9.4 | 4.4 | 15 nm-30 nm |
| Si3N4 | 8.4 | | 20 nm-40 nm |
| ZnO | 10.3 | 3.3 | 5 nm-10 nm |
| NiCr | 11 | | 0.2-0.4 nm |
| Ag | 6.3 | | 14 nm |
| ZnO | 5.3 | | 5 nm-10 nm |
| ZnSnO | 10.3 | | 5 nm-10 nm |
| SiZrN | 9.3 | 4.3 | 15 nm-30 nm |
| Si3N4 | 8.3 | | 20 nm-40 nm |
| ZnO | 7.2 | 3.2 | 5 nm-10 nm |
| NiCr | 11 | | 0.2-0.4 nm |
| Ag | 6.2 | | 17 nm |
| ZnO | 5.2 | | 5 nm-10 nm |
| ZnSnO | 10.2 | | 5 nm-10 nm |
| SiZrN | 9.2 | 4.2 | 15 nm-30 nm |
| Si3N4 | 8.2 | | 20 nm-40 nm |
| ZnO | 7.1 | 3.1 | 5 nm-10 nm |
| NiCr | 11 | | 0.2 nm-0.4 nm |
| Ag | 6.1 | | 12 nm |
| ZnO | 5.1 | | 5 nm-10 nm |
| Si3N4 | 4.1 | | 20 nm-40 nm |
| Glass as substrate | 1 | | 2.1 mm |

The layer of optically highly refractive material 4, the smoothing layer 10, the matching layer 5 and 7, and the electrically conductive layer 6 were deposited by cathode-ray sputtering. The target for the deposition of the matching layer 5 and 7 contained 92 wt.-% zinc oxide (ZnO). The target for the deposition of the smoothing layer 10 contained 68 wt.-% tin, 30 wt.-% zinc. The target for the deposition of the layer of optically highly refractive material 4 contained 52.9 wt.-% silicon, 43.8 wt.-% zirconium. The deposition of the smoothing layer 10 was done under addition of oxygen as reaction gas during the cathodic sputtering. The deposition of the layer of optically highly refractive material 4 was done under addition of nitrogen as reaction gas during the cathodic sputtering.

FIG. 2 and FIG. 3 depict in each case a detail of the transparent pane as part of a composite pane. The composite pane is intended as a windshield of a passenger car. The transparent substrate 1 is joined to a second pane 13 via a thermoplastic intermediate layer 12. FIG. 2 depicts a plan view of the surface of the transparent substrate 1 facing away from the thermoplastic intermediate layer. The transparent substrate 1 is the pane facing the interior of the car. The transparent substrate 1 and the second pane 13 contain float glass and have a thickness of 2.1 mm in each case. The thermoplastic intermediate layer 12 contains polyvinyl butyral (PVB) and has a thickness of 0.76 mm.

The electrically conductive coating 2 is applied on the surface of the transparent substrate 1 facing the thermoplastic intermediate layer 12. The electrically conductive coating 2 is an electrically heatable coating with corresponding electrical contacting. The electrically conductive coating 2 extends over the entire surface of the transparent substrate 1, minus a peripheral frame-like coating-free region with a width b of approx. 8 mm. The coating-free region serves for the electrical insulation between the voltage-carrying electrical coating 2 and the vehicle body. The coating-free region is hermetically sealed by gluing with the intermediate layer 12 in order to protect the electrically conductive coating 2 against damage and corrosion.

A busbar 14 is arranged in each case on the outer upper and lower edge of the transparent substrate 1 for the electrical contacting of the electrically conductive coating 2. The busbars 14 were printed on the electrically conductive coating 2 using a conductive silver paste and fired. The layer thickness of the fired silver paste is 15 μm. The busbars 14 are electrically conductively connected to the underlying areas of the electrically conductive coating 2.

The busbar 14 is in each case soldered to a feed line 15. The feed lines 15 are made of tinned copper foils with a width of 10 mm and a thickness of 0.3 mm. The electrically heatable coating 2 is connected to a voltage source 16 via the busbars 14 and the feed lines 15. The voltage source 16 is, for example, the 14 V, 24 V or 40 V on-board voltage of a motor vehicle.

On the second pane 13, an opaque color layer with a width a of 20 mm is applied frame-like on the edge of the surface facing the thermoplastic intermediate layer 12 as a masking print 17. The masking print 17 obscures the view of the adhesive strand with which the transparent pane is glued into the vehicle body. The masking print 17 serves simultaneously as protection of the adhesive against UV radiation and thus as protection against premature aging of the adhesive. Furthermore, the busbars 14 and the feed lines 15 are obscured by the masking print 17.

LIST OF REFERENCE CHARACTERS (1) transparent substrate
(2) electrically conductive coating
(3), (3.1), (3.2), (3.3), (3.4) functional layer
(4), (4.1), (4.2), (4.3), (4.4) a layer of optically highly refractive material
(5), (5.1), (5.2), (5.3), (5.4) first matching layer
(6), (6.1), (6.2), (6.3), (6.4) electrically conductive layer
(7), (7.1), (7.2), (7.3), (7.4) second matching layer
(8) layer of a dielectric material with a refractive index ≤2.1
(9) layer of an optically highly refractive material with a refractive index ≥2.1
(10), (10.2), (10.3), (10.4) smoothing layer
(11) blocker layer
(12) intermediate layer
(13) second pane
(14) busbar
(15) feed line
(16) voltage source
(17) masking print
a width of the region masked by (17)
b width of the edge deletion
A-A' section line

The invention claimed is:
1. A transparent pane, comprising:
a transparent substrate; and
an electrically conductive coating on a surface of the transparent substrate,
wherein the electrically conductive coating comprises four functional layers arranged one atop another,
wherein each functional layer includes
a layer of optically highly refractive material with a refractive index >1.3,
a first matching layer above the layer of optically highly refractive material,
an electrically conductive layer above the first matching layer, and
a second matching layer above the electrically conductive layer, wherein the layer thickness of each electrically conductive layer is from 5 nm to 25 nm and a total layer thickness of all electrically conductive layers is from 20 nm to 100 nm, wherein the layer of optically highly refractive material arranged between two electrically conductive layers includes a layer of a dielectric material with a refractive index less than or equal to 2.1, and a layer of an optically highly refractive material with a refractive index greater than or equal to 2.1, and wherein a further layer of optically highly refractive material with a refractive index >1.9 arranged above an uppermost functional layer.

2. The transparent pane of claim 1, wherein a thickness of the layer of optically highly refractive material is from 10 nm to 100 nm.

3. The transparent pane of claim 1, wherein the refractive index of the layer of optically highly refractive material with the refractive index >1.3 is greater than or equal to 1.9.

4. The transparent pane of claim 1, wherein the thickness of the layer of optically highly refractive material arranged between the two electrically conductive layers is from 20 nm to 100 nm.

5. The transparent pane of claim 1, wherein the layer of optically highly refractive material with the refractive index >1.3 comprises silicon nitride.

6. The transparent pane of claim 1, wherein the layer of optically highly refractive material arranged between two electrically conductive layers comprises a mixed silicon/zirconium nitride.

7. The transparent pane of claim 1, wherein, between the two electrically conductive layers, a smoothing layer is arranged below one of the matching layers.

8. The transparent pane of claim 1, wherein the electrically conductive layer comprises silver or a silver-containing alloy.

9. The transparent pane of claim 1, wherein a functional layer, has a blocker layer adjacent to the electrically conductive layer and the blocker layer includes nickel, chromium, or alloys thereof.

10. The transparent pane of claim 9, wherein the blocker layer has a thickness of 0.1 nm to 5 nm.

11. The transparent pane of claim 1, wherein the transparent substrate is joined to a second pane via a thermoplastic intermediate layer to form a composite pane and wherein the composite pane has a total transmittance of greater than 70%.

12. A method of producing a transparent pane with an electrically conductive coating, comprising:

applying four functional layers successively on a transparent substrate;

wherein the step of applying each functional layer includes applying a layer of optically highly refractive material with a refractive index larger than 1.3 on the transparent substrate, applying a first matching layer above the layer of optically highly refractive material, applying an electrically conductive layer above the first matching layer, and applying a second matching layer above the electrically conductive layer;

applying a layer of dielectric material with a refractive index less than or equal to 2.1 between two electrically conductive layers;

applying a layer of an optically highly refractive material with a refractive index greater than or equal to 2.1 between the two electrically conductive layers; and arranging a further layer of optically highly refractive material with a refractive index larger than 1.9 above an uppermost functional layer, wherein the layer thickness of each conductive layer is from 5 nm to 25 nm and a total layer thickness of all electrically conductive layers is from 20 nm to 100 nm.

13. A method of using a transparent pane, comprising:
providing a transparent pane according to claim 1; and
using the transparent pane as a windshield in motor vehicles.

* * * * *